United States Patent [19]

Sokolov et al.

[11] 4,240,818
[45] Dec. 23, 1980

[54] PROCEDURE FOR PREPARING NITROGEN-POTASSIUM FERTILIZER

[76] Inventors: Igor D. Sokolov, Zanevsky prospekt, 32, kv. 200; Jury S. Safrygin, ulitsa Dekabristov, 29, kv. 36; Alexandr V. Muraviev, prospekt Kima, 4, kv. 210; Nina K. Andreeva, 2 Komosomolskaya ulitsa, 57, korpus 1, kv. 22, all of Leningrad, U.S.S.R.

[21] Appl. No.: 19,747

[22] Filed: Mar. 12, 1979

[51] Int. Cl.$^3$ ............................ C05C 1/00; C05C 5/02
[52] U.S. Cl. ............................................ 71/59; 71/61; 423/396; 423/397
[58] Field of Search ........................ 71/59, 58, 61, 54; 423/396, 397, 395

[56] References Cited

U.S. PATENT DOCUMENTS

| | | | |
|---|---|---|---|
| 1,009,560 | 11/1911 | Peacock | 423/397 X |
| 1,964,158 | 6/1934 | Holz | 423/397 |
| 2,115,857 | 5/1938 | Kaselitz | 423/395 |

FOREIGN PATENT DOCUMENTS

| | | | |
|---|---|---|---|
| 1120475 | 12/1961 | Fed. Rep. of Germany | 71/59 |
| 377131 | 7/1932 | United Kingdom | 423/397 |

Primary Examiner—Kenneth M. Schor
Attorney, Agent, or Firm—Lackenbach, Lilling & Siegel

[57] ABSTRACT

A procedure is disclosed for preparing nitrogen-potassium fertilizer residing in interaction of potassium hydrogen sulfate with calcium nitrate, barium nitrate or strontium nitrate in an aqueous medium, followed by treatment of the reaction mass with ammonia, separation of the resulting slightly soluble sulfate and isolation of the desired product.

9 Claims, No Drawings

PROCEDURE FOR PREPARING NITROGEN-POTASSIUM FERTILIZER

FIELD OF THE INVENTION

The present invention relates to processes for producing mineral fertilizers, and more particularly to a procedure for preparing nitrogen-potassium fertilizers which find wide application in agriculture when there is a shortage of chlorine-free or ballast-free potassium fertilizers.

These fertilizers are essential for such plants as tobacco, oil-producing crops, citrus plants, vine, potatoes, flax and others having non-sensitivity to chloride ion. Chlorine-free nitrogen-potassium fertilizers make it possible to increase both the yield capacity of crops and the quality of agricultural products through the improvement of flax grade, higher starch content of potato tubers, higher sugar content of grapes, etc.

BACKGROUND OF THE INVENTION

Known in the art is a procedure for preparing nitrogen-potassium fertilizer, e.g. potassium nitrate, by interaction of calcium nitrate with potassium chloride in an aqueous medium (cf. U.S. Pat. No. 3,361,522). By this procedure potassium nitrate is crystallized into a solid phase as a result of cooling the obtained solution to a temperature of $-10°$ C. to $-20°$ C. The mother solution is concentrated and double salt $KNO_3.CaCl_2.2H_2O$ previously added to the initial solution is precipitated therefrom. Upon precipitating the double salt and removing calcium chloride precipitate, the mother solution is recycled as well.

The most serious disadvantages of above procedure reside in general chloride contamination of the final product, intricacy of the technological process including stages of potassium nitrate crystallization upon cooling to a temperature of $-10°$ C. to $-20°$ C., evaporation of the solutions and separation of the double salt at a temperature of $20°$ to $25°$ C., separation and purification of calcium chloride. The complexity of this technological process results in a great expenditure of energy.

Also known in the art are procedures (cf. U.S. Pat. No. 3,690,819, British Pat. No. 1,313,926) involving preparation of potassium nitrate by precipitating it from the solution containing calcium nitrate and potassium chloride. Upon separating potassium nitrate, the mother solution is treated with lime to produce calcium oxychloride $CaCl_2.3CaO.16H_2O$.

The disadvantages of such procedure reside in chloride contamination of the final product, intricacy of technological operations including extra treatment of the mother solution with lime to produce calcium oxychloride. Since there is no demand for calcium oxychloride, it is to be rejected thus resulting in pollution of the environment by toxic substances.

Also known in the art is a procedure for preparation of potassium nitrate (cf. French Pat. No. 2,805,580) by interacting calcium nitrate with potassium chloride in an aqueous medium in the presence of monoalcohols, polyalcohols or ketones.

The disadvantage of above procedure is intricacy of the process at the expense of using organic compounds, which involves the necessity of their regeneration and results in substantial increase in toxicity, fire- and explosion-hazards of the process.

Also known in the art is a procedure for preparing potassium nitrate from calcium nitrate and potassium sulfate (cf. F.R.G. Pat. No. 974,061). Taken in stoichiometric ratio the starting components, i.e. potassium sulfate and calcium nitrate are introduced into the mother solution containing nearly 5% excess of calcium nitrate. The gypsum suspension thus produced is filtered, the gypsum remaining onto the filter is washed with water, the mother solution is cooled to produce potassium nitrate, while the solution is evaporated and recycled.

The above procedure suffers from the disadvantages residing in intricacy of the process due to the necessity for rigid control of the calcium nitrate content of the solution, which should be at a level of 5% in excess of the stoichiometric amount. A reduced amount of the nitrate results in substantial potassium losses through the production of syngenite, while its increased level promotes both contamination of the final product with calcium nitrate and degradation of physical-and-chemical properties of the fertilizer due to hygroscopicity of calcium nitrate.

There is also known a procedure for preparing nitrogen-potassium fertilizer by an exchange interaction of potassium sulfate with calcium nitrate in an aqueous medium followed by separation of gypsum from the potassium nitrate solution, evaporation of the mother solution and its subsequent recycling (cf. Inventor's Certificate of the USSR No. 382,595). The process of interacting calcium nitrate with potassium sulfate is carried out in an excess of the potassium sulfate which is dissolved in the circulating mother solution to produce lye of 8 to 15% concentration on the basis of $K_2SO_4$.

The most serious disadvantage of said procedure is preparation of fertilizer having an unbalanced ratio of the nutritive elements, namely nitrogen and potassium, which results in lower agrochemical effectiveness of the desired product. By the known procedure, as a nitrogen-potassium fertilizer, potassium nitrate is prepared wherein the ratio of nitrogen to potassium oxide ($K_2O$) is about 1 to 3.4 (approximately 14% of nitrogen and approximately 47% of $K_2O$). However practical experience with fertilizers has shown the necessity for the products used as fertilizers for basic agricultural crops to be rich in nitrogen. Thus fixed nitrogen, e.g. in the form of ammonium nitrate, should be used together with potassium nitrate, which fact implies both production of the former and adoption of the equipment applied for flour mixing.

Another disadvantage of the known procedure is the probability of producing a non-homogeneous fertilizer because of stratification of its components.

One more disadvantage of the known procedure is the envisaged application of potassium sulfate in excess of stoichiometric amount. In case this condition is not met when producing potassium nitrate by the known procedure, an appreciable loss of potassium occurs through the formation of syngenite $K_2Ca(SO_4)_2.H_2O$ which is brought out of the process together with calcium sulfate. Thus it is essential that rigid control be exercised over the excess level of potassium sulfate, which is rather difficult under industrial conditions.

SUMMARY OF THE INVENTION

It is an object of the present invention to provide a procedure for preparing nitrogen-potassium fertilizer, which ensures improved quality of the fertilizer due to its nitrogen enrichment and higher agrochemical effectiveness.

Another object of the present invention is to provide a procedure for preparing ballast-free fertilizer having a preset balanced ratio of its nutrient components (N to $K_2O$). Still another object of the present invention is to eliminate contamination of the nitrogen-potassium fertilizer with chlorides.

Yet another object of the present invention is to simplify the technological process making impossible both syngenite production and loss of potassium with slightly soluble sulfates.

A further object of the present invention is the possibility of using waste products containing barium nitrate or strontium nitrate as starting materials.

With these and other objects in mind, there is proposed a procedure for preparing a nitrogen-potassium fertilizer by interaction of potassium sulfate with nitrates in an aqueous medium followed by separation of the slightly soluble sulfate thus obtained and isolation of the desired product. In accordance with the invention, potassium hydrogen sulfate is used as potassium and is brought into interaction with calcium nitrate strontium nitrate or barium nitrate, the resulting reaction mass being treated with ammonia.

To increase the nitrogen fraction of nitrogen-potassium fertilizer, the reaction mass is treated with ammonia to adjust to a pH-value of 5 to 7. Nitric acid resulting from the interaction of potassium hydrogen sulfate with nitrates is neutralized to give ammonium nitrate. The ratio of N to $K_2O$ of the nitrogen-potassium fertilizer is defined by the ratio of ammonium nitrate to potassium nitrate in the solution.

To improve the filtering characteristics of slightly soluble sulfates, namely barium sulfate, ammonia is introduced successively into the reaction mass, i.e. the ammonia treatment is performed up to a pH-value of 1 to 5, slightly soluble sulfate is separated, and the reaction mass is neutralized with ammonia up to a pH-value of 5 to 7.

To increase the solubility of both the starting reagents and the resultant potassium nitrate or ammonium nitrate, the process is advantageously carried out over the range of temperatures of 60° to 100° C., however the possibility of carrying out the process at higher temperatures is not obviated thus requiring operations to be accomplished under pressure, or at temperatures up to 0° C. thus involving a decrease in solubility of the salts and increase of energy consumption to dehydrate the solutions. A temperature decrease might be justified if it is necessary to prepare fine crystalline precipitates.

DETAILED DESCRIPTION OF THE INVENTION

The proposed procedure is accomplished as follows. The starting materials are charged into a reactor. Potassium hydrogen sulfate and calcium nitrate, strontium nitrate or barium nitrate are used as starting materials.

According to the requirements of the fertilizer composition, any specified ratio of N to $K_2O$ can be obtained by the proposed procedure by changing the composition of potassium hydrogen sulfate. Potassium hydrogen sulfate can be prepared by mixing a sulfuric acid solution with potassium sulfate at a predetermined ratio of $K_2SO_4$ to $H_2SO_4$. Thus a nitrogen-potassium fertilizer is produced in which an equivalent ratio of $KNO_3$ to $HNO_3$ is achieved and, consequently, a specified ratio of N to $K_2O$. It is also possible to use potassium hydrogen sulfate prepared from potassium chloride and sulfuric acid. A specified ratio of $K_2SO_4$ to $H_2SO_4$ in potassium hydrogen sulfate is maintained by changing the KCl to $H_2SO_4$ ratio.

Use of potassium hydrogen sulfate prepared from sulfuric acid and potassium chloride in accordance with the proposed procedure proves to be more effective than use of potassium sulfate prepared from the same components, since potassium hydrogen sulfates are produced at low temperature (80° to 240° C.) in one stage, while known procedures for preparing potassium sulfate from potassium chloride and sulfuric acid envisage carrying out the process at temperatures of 500° to 700° C., thus resulting in increased metal corrosion, adhesion of the reaction mass onto the reactor walls, as well as contamination of the resultant hydrogen chloride with impurities.

The proposed procedure makes it also possible to use acid solutions of potassium sulfate, e.g. those resulting from decomposition of nephelines and alunites with nitric acid and containing the latter.

Thus, the reaction mass charged into the reactor is agitated preferentially at a temperature of 60° to 100° C. to increase the solubility of the starting materials and resultant nitrates, as well as to decrease the duration of the process.

The reaction proceeds therewith to form slightly soluble sulfate, and can be expressed by the following equation:

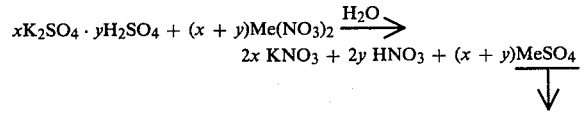

wherein Me is Ca, Sr, Ba.

The reaction mass thus obtained is treated in the reactor with ammonia or ammonia water up to a pH-value of 5 to 7, and the resulting nitric acid is neutralized to form ammonium nitrate according to the reaction

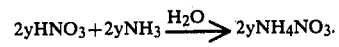

The resultant suspension is separated by filtration to give slightly soluble sulfate ($CaSO_4.2H_2O$, $CaSO_4.0.5\text{-}H_2O$, $BaSO_4$, $SrSO_4$) and the mother solution which is dehydrated by drying or by evaporating and drying to obtain the final product composed of $2xKNO_3.2yNH_4NO_3$ representing a homogeneous composite nitrogen-potassium fertilizer. In this case change of the x:y ratio of hydrogen sulfate involves changing the ratio of $KNO_3$ to $NH_4NO_3$.

To alter the physical-and-chemical properties of slightly soluble sulfates, e.g. to prepare easily filterable sediments of barium sulfate, ammonia is introduced successively into the reaction mass, i.e. by treating the mass with ammonia up to a pH-value of 1 to 5 followed by separating slightly soluble sulfate, e.g. by means of filtration, then adjusting pH-value of the resulting solution up to 5 to 7, and isolating the final product, e.g. by way of crystallization and drying. The washings obtained from washing slightly soluble sulfates from the desired product are either removed together with the mother solution, or used in preparation of the reaction mass to wash new portions of slightly soluble sulfates, and for other purposes as well.

The slightly soluble sediments may be used, for instance, in the production of building materials.

Nitrogen-potassium fertilizers composed of potassium nitrate and ammonium nitrate are promising ones, since the proposed procedure allows to change, in accordance with agricultural requirements, the ratio of its nutrient components over wide limits, which makes it possible to use a composite fertilizer for practically all agricultural plants.

The proposed procedure is distinguished by the simplicity of its technological operations and has a number of advantages over known procedures, as follows:

it makes it possible to prepare ballast-free nitrogen-potassium fertilizer enriched with nitrogen and composed of potassium nitrate and ammonium nitrate in specified ratios of its nutrient components (N:K$_2$O);

due to crystallization of slightly soluble sulfates under the conditions of an acid medium, there is no risk of potassium loss through syngenite formation. Process regulation is simpler and the equipment load decreased;

the resulting fertilizer has high agrochemical characteristics and retains it homogeneity during transportation and storage;

use of potassium hydrogen sulfates in the production of nitrogen-potassium fertilizers eliminates disadvantages (low economic effectiveness, corrosion of the equipment at high temperature, etc.) inherent in the procedure for preparing potassium nitrate from potassium sulfate resulting from interaction of sulfuric acid with potassium chloride;

the proposed procedure makes it possible to use acid wastes containing potassium sulfate, and its realization does not involve production of secondary wastes polluting the environment with toxic substances.

The use of barium nitrate or strontium nitrate according to the proposed procedure makes it possible to apply production wastes containing these salts.

For a better understanding of the present invention specific examples are given hereinbelow by way of illustration.

EXAMPLE 1

10 kg of potassium hydrogen sulfate (prepared by mixing 8.5 kg of K$_2$SO$_4$ and 1.5 kg of H$_2$SO$_4$) were agitated in a reactor and treated with 10.8 kg of calcium nitrate at a temperature of 60° C. for 30 min. The resulting suspension was neutralized with 10% ammonia water adjusting the pH up to a value of 6.8 and separated by filtration. The sediment thus obtained was washed to give 17.4 kg of wet gypsum (62.25% CaSO$_4$.2H$_2$O) and washings. The mother solution was dried in spray drier at a temperature of 140° C. to give 12.5 kg of the final product having the following composition:

KNO$_3$—78.80%, where potassium content was 30.48%, or K$_2$O content was 36.71%, and nitrogen (N) content was 10.92%;
NH$_4$NO$_3$—19.60%, where nitrogen content was 6.86%;
CaSO$_4$.2H$_2$O—1.60%. K$_2$O—36.71%, N—17.78%.
Thus the ratio of N:K$_2$O was 1:2.1.

EXAMPLE 2

42.73 kg of potassium chloride (KCl—98%, NaCl—2%) were treated in a reactor with concentrated sulfuric acid (93% H$_2$SO$_4$) at a temperature of 100° C. for 4 hours. As a result, 76.50 kg of potassium hydrogen sulfate (98.04% KHSO$_4$, 1.64% NaHSO$_4$) were produced.

Potassium hydrogen sulfate was dissolved in 136.93 kg of the washings [KNH$_4$(NO$_3$)$_2$—10.83%, NaNO$_3$—0.10%, NaCl—0.03%, CaSO$_4$.2H$_2$O—0.40%, H$_2$O—88.64%] resulting from washing gypsum at subsequent stages of the process (see Example 1), and then treated with 92.16 kg of calcium nitrate (17%) at a temperaure of 60° C. for 15 min.

The resultant suspension was diluted with 55.42 kg of water and then treated with 9.48 kg of gaseous ammonia up to a pH-value of 6.5.

The suspension in an amount of 370.49 kg was filtered, and the gypsum sediment thus obtained was washed with water. As a result, 214.46 kg of gypsum [CaSO$_4$.H$_2$O—44.04%, KNH$_4$(NO$_3$)$_2$—0.7%, NaNO$_3$—0.01%, H$_2$O—54.38%,] 334.8 kg of the combined solution comprising the mother solution and strong washings [KNH$_4$(NO$_3$)$_2$—29.54%, NaNO$_3$—0.26%, NaCl—0.07%, CaSO$_4$.2H$_2$O—0.56%, H$_2$O—69.57%], and 136.93 kg of diluted washings subsequently used for dissolution of potassium hydrogen sulfate were obtained.

The combined solution was dried at a temperature of 100° C. to give 102 kg of the desired product having the following composition:

KNH$_4$(NO$_3$)$_2$—96.95%
CaSO$_4$.2H$_2$O—1.83%
NaNO$_3$—0.86%
NaCl—0.22%
H$_2$O—0.14%

The N:K$_2$O ratio of the final product was 1:1.1.

EXAMPLE 3

The procedure is the same as in Example 2 except that 47.4 kg of ammonia water (20% NH$_3$) was used instead of gaseous ammonia to obtain a product of the same composition.

EXAMPLE 4

100 kg of a solution containing 10 kg of potassium hydrogen sulfate (1.0 kg of K$_2$SO$_4$ and 9.0 kg of H$_2$SO$_4$) were treated with 16 kg of calcium nitrate at a temperature of 90° C. The resulting suspension was neutralized with ammonia up to a pH-value of 6.0 and separated by filtration, the sediment being washed with water to give 31 kg of wet gypsum (53.38% CaSO$_4$.2H$_2$O).

The mother solution was evaporated and then dehydrated to give 16.15 kg of the final product having the following composition:

KNO$_3$—7.18%
NH$_4$NO$_3$—90.00%
CaSO$_4$.2H$_2$O—1.49%
H$_2$O—1.33%

The ratio of K$_2$O to N in the product was 1:9.7.

EXAMPLE 5

100 kg of solution containing 10 kg of potassium hydrogen sulfate (5 kg of K$_2$SO$_4$ and 5 kg of H$_2$SO$_4$) were treated with 10.8 kg of barium nitrate at a temperature of 100° C. for 90 min. The resulting suspension was neutralized with ammonia water up to a pH-value of 3.0 and then subjected to filtration. The deposit remaining on the filter was washed with water to give 30 kg of wet barium sulfate (62% BaSO$_4$). The mother solution was once more neutralized with ammonia water up to a pH-value of 6.8 and then dried to give 14 kg of a final product having the following chemical composition:
- $KNO_3$—41.43%
- $NH_4NO_3$—58.28%
- $H_2O$—0.29%

The ratio of N to $K_2O$ in the final product was 1:1.2.

EXAMPLE 6

The procedure is the same as in Example 5 except that potassium hydrogen sulfate was treated with 97.2 kg of 10% solution of barium nitrate at a temperature of 5° C. for 2 hours.

The ratio of N to $K_2O$ in the final product was 1:1.2. Composition of the product in the same as in Example 5.

EXAMPLE 7

100 kg of solution containing 20 kg of potassium hydrogen sulfate (10 kg of $K_2SO_4$ and 10 kg of $H_2SO_4$) were treated with 38.8 kg of strontium nitrate at a temperature of 80° C. for 45 min.

The resulting suspension was neutralized with ammonia up to a pH-value of 6.5 and then filtered to give 59 kg of strontium sulfate (49.6% $SrSO_4$). The mother solution was dried to give 28.5 kg of a final product having the following composition:
- $KNO_3$—40.7%
- $NH_4NO_3$—57.3%
- $SrSO_4$—0.1%
- $H_2O$—1.9%

The ratio of N to $K_2O$ in the final product was 1:1.2.

EXAMPLE 8

100 kg of soluton containing 30 kg of potassium hydrogen sulfate (20 kg of $K_2SO_4$ and 10 kg of $HNO_3$ or 6.2 kg of $K_2SO_4$, 7.8 kg of $H_2SO_4$ and 16.0 kg of $KNO_3$), e.g. prepared by nitric acid decomposition of alunites, were treated with 19 kg of calcium nitrate at a temperature of 70° C. for 45 min. The resultant suspension was neutralized with ammonia adjusting the pH to a value of 6.9 and then filtered to give 32 kg of wet gypsum (56.3% $CaSO_4.2H_2O$). The solution was dehydrated to give a final product having the following composition:
- $KNO_3$—62.70%
- $NH_4NO_3$—34.32%
- $CaSO_4.2H_2O$—2.16%
- $H_2O$—0.82%

The ratio of nutrient components (N to $K_2O$) in the final product was 1:1.4.

What is claimed is:

1. A process for preparing a nitrogen-potassium fertilizer, comprising:

reacting in an aqueous medium, potassium hydrogen sulfate with a nitrate selected from the group consisting of calcium nitrate, barium nitrate, and strontium nitrate, in accordance with the following equation:

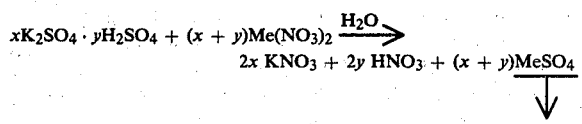

where Me is Ca, Sr, Ba;

treating the resulting reaction mass with ammonia to neutralize the nitric acid in accordance with the equation:

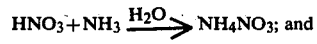

separating the slightly soluble sulfate from the product containing the nitrogen-potassium fertilizer.

2. A process as claimed in claim 1, wherein said reaction mass is treated with ammonia to a pH-value of 5 to 7.

3. A process as claimed in claim 1, wherein the potassium hydrogen sulfate is prepared from sulfuric acid and potassium sulfate.

4. A process as claimed in claim 1, wherein the potassium hydrogen sulfate is prepared from sulfuric acid and potassium chloride.

5. A process as claimed in claim 1, wherein the reaction mass is initially treated with ammonia to a pH of 1 to 5, followed by separation of the slightly soluble sulfate and final adjustment of the pH to a value of 5 to 7 followed by isolation of the nitrogen-potassium product.

6. A process as claimed in claim 1, wherein the nitrate is calcium nitrate.

7. A process as claimed in claim 1, wherein the nitrate is barium nitrate.

8. A process as claimed in claim 1, wherein the nitrate is strontium nitrate.

9. A process as claimed in claim 1, wherein the reaction is conducted at temperatures of 60°–100° C.